Feb. 23, 1965    A. E. PETERSON    3,170,727
AUXILIARY SEAT FOR CHILD
Filed July 29, 1963    2 Sheets-Sheet 2
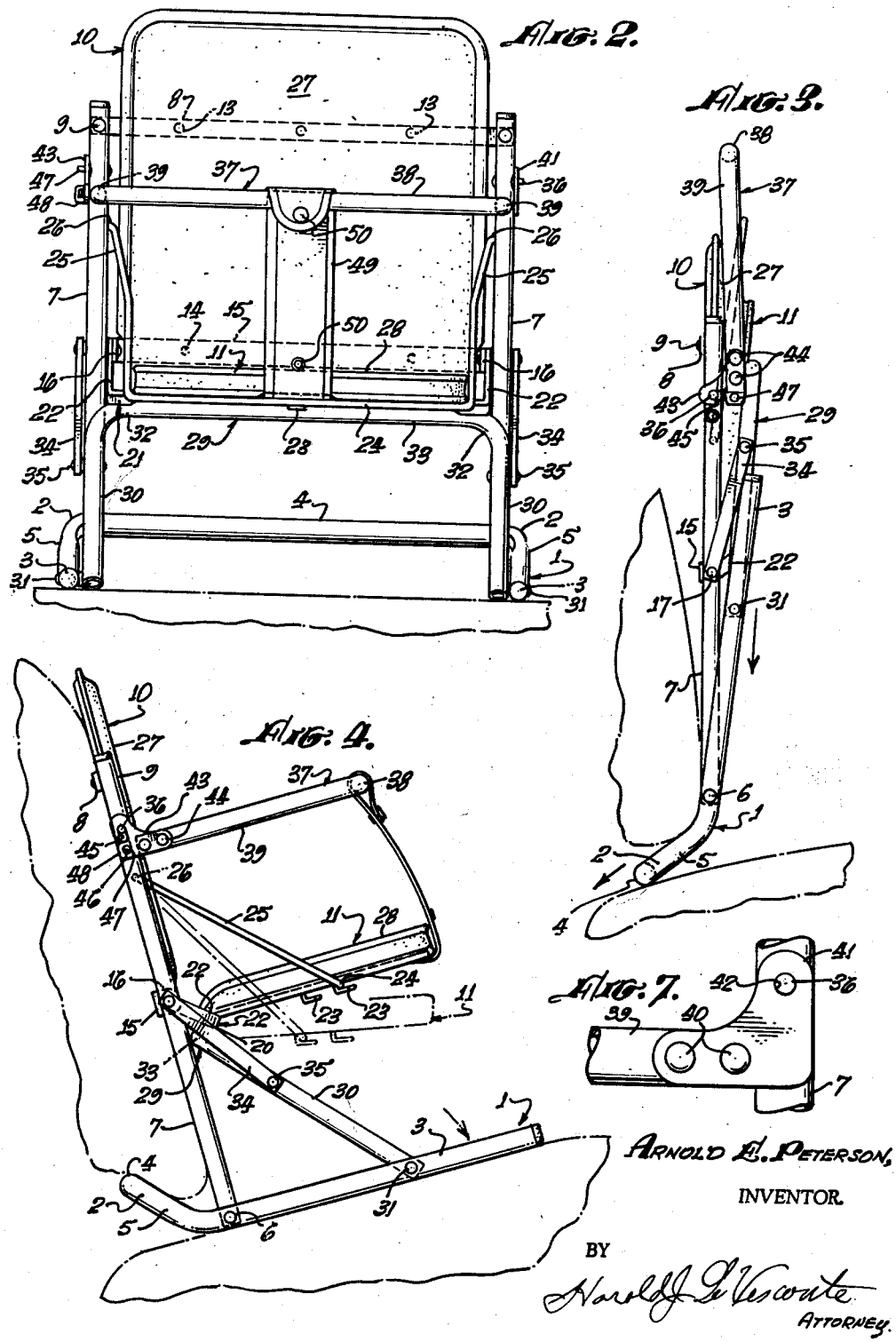
Arnold E. Peterson,
INVENTOR.

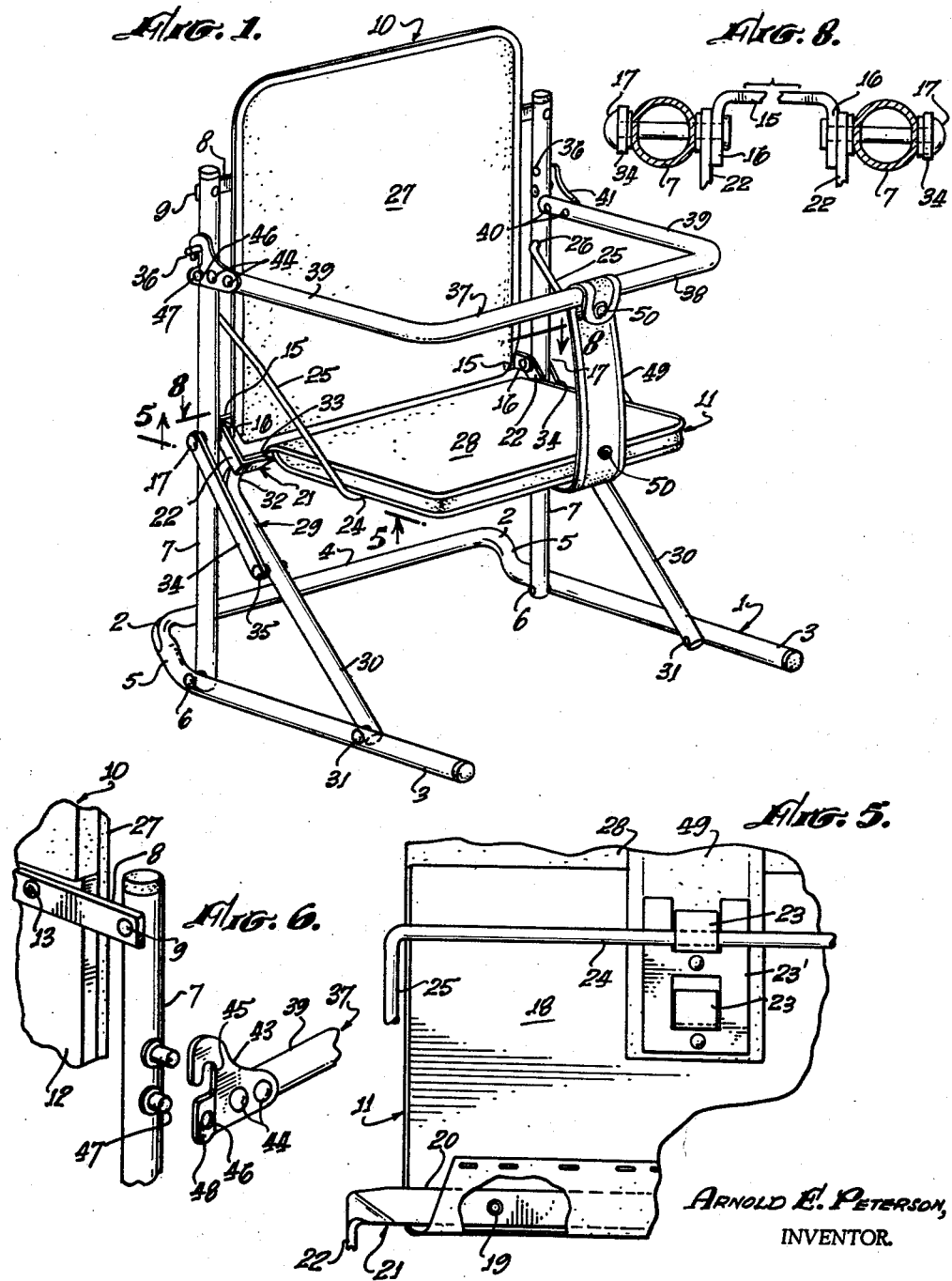

United States Patent Office 3,170,727
Patented Feb. 23, 1965

1

3,170,727
AUXILIARY SEAT FOR CHILD
Arnold E. Peterson, 700 Allen Ave., Glendale, Calif.
Filed July 29, 1963, Ser. No. 298,177
5 Claims. (Cl. 297—253)

This invention relates to auxiliary automobile seats for small children.

An object of the invention is to provide a child's car seat which is self-attaching to an automobile seat, thus dispensing with the necessity for separate straps or hooks or other attaching means.

Another object of the invention is to provide a detachable auxiliary seat for children which is self-securing to an automobile seat by positive engagement with the resilient back and seat portions of the automobile seat.

A further object of the invention is to provide an auxiliary seat for children in which the foregoing objectives are met and in which the angle between the back and seat components of the auxiliary seat may be varied.

A still further object of the invention is to provide a seat of the foregoing character which folds up into compact space when not in use and, when open for use, includes over-center toggle means effective to lock it in said open position.

Still another object of the invention is to provide a collapsible auxiliary seat of the above character in which the movement of the seat from a collapsed condition to the position of use serves addtionally to interlock it with the automobile seat construction.

With the foregoing objects in view together with such additional objects and advantages as may subsequently appear the invention resides in the parts, and in the construction, combination and arrangement of parts described, by way of example, in the following specification of a presently preferred embodiment of the invention, reference being had to the accompanying drawings which form a part of said specification and in which drawings:

FIG. 1 is a perspective front view of an auxiliary seat for children constituting a presently preferred embodiment of the invention as opened up for use, FIG. 2 is a front elevational view of the opened seat, FIG. 3 is a side elevational view of the seat shown in the preceding figures as folded up and indicating the mode of installation of the seat on an automobile seat, FIG. 4 is a side elevational view of the seat shown in the preceding figures as opened up and operating to secure itself to the automobile seat, FIG. 5 is an enlarged scale, fragmentary, bottom plan view of a portion of the seat component of the invention showing details of the means for varying the angle of the seat component relative to the back component, taken on line 5—5 of FIG. 1, FIG. 6 is an enlarged scale fragmentary exploded view showing details of the locking means for the arm rest and restraining bar component of the invention, FIG. 7 is a side elevational view of the attaching means for the opposite side of the arm rest component, and FIG. 8 is a fragmentary, enlarged scale, sectional top plan view of the combined pivot means for the toggle device which locks the seat in open position and for the hinging of the seat component of the device, the view being taken on the line 8—8 of FIG. 1.

Referring to the drawings, the base component 1 of the illustrated embodiment of the device comprises a length of tubing bent into a modified U-shape with the corner bends 2, 2 thereof providing parallel forwardly projecting arms 3, 3 and a back portion 4 extending at right angles to said arms and said arms forwardly of the bends 2, 2 being bent to provide short diagonally upwardly and rearwardly extending runs 5, 5, having reference to the attitude of the seat when in position of use as

2 shown in FIGS. 1, 2 and 4. The seat and back assembly of the device is mounted on said base component by rivets 6, 6 which pivotally connect the lower ends of a pair of post elements 7, 7 of the seat and back assembly to the inner sides of the arms 3, 3 closely adjacent to the runs 5, 5 thereof; the upper ends of said post elements being interconnected by a cross bar 8 secured thereto by rivets 9, 9, said bar cooperating with the rivets 6, 6 to hold the posts in spaced parallel relation to each other.

The seat back sub-assembly 10 is of a width which is slightly less than the distance between the posts 7, 7 and it extends beyond the upper end of said posts a short distance and downwardly to a point slightly above the plane of the seat assembly 11 when the device is open for use. The seat back sub-assembly comprises a rigid base element 12 preferably formed from a piece of composition board generally known as "hard board" and adjacent its upper edge is secured by rivets 13, 13 to the same side of the bar 8 as the posts 7, 7 and it is further secured by rivets 14, 14 at its lower end to a transverse bar 15 having forwardly bent ends 16, 16 spaced from the side edges of the back sub-assembly and pivotally mounted on rivets 17, 17 extending through the posts 7, 7 at a point adjacent to the corner formed by the juncture of the back and seat assemblies when the device is open for use.

The seat sub-assembly 11 similarly comprises a rigid base element 18 of the said "hard board" type of material having the rear edge thereof connected by rivets 19 to the horizontal run 20 of a bar 21 having rearwardly bent ends 22, 22 also pivotally mounted on the rivets 17, 17 between the ends 16, 16 of the bar 15 and the posts 7, 7, whereby the seat sub-assembly is mounted for swinging movement about the rivets 17, 17 between a folded position against the back sub-assembly and a selected one of a plurality of open positions determined by the engagement of a selected one of a plurality of forwardly facing hooks 23 here shown as being formed in a plate 23′ attached to the bottom of the base element 18, and a rectangular bail 24 having arms 25, 25 thereof provided with outturned ends 26, 26 which pivotally engage holes formed in the sides of the posts 7, 7 which are adjacent to the side edges of the back sub-assembly. The base elements of the back assembly and seat assembly may be provided with appropriate cushioning and cover elements as indicated at 27 and 28, respectively.

The means for maintaining the seat and back assembly comprising the posts and the back and seat assemblies carried thereby in erected position on the base component 1 comprises a toggle means including a first toggle member 29 comprising a length of tubing bent into a modified U-shape having the ends of the arms 30, 30 thereof pivotally connected to the inner faces of the base element arms 3, 3 by rivets 31, 31; the length of the arms 30, 30 being such that when the posts 7, 7 are at right angles to the arms 3, 3, the bends 32, 32 between the horizontal run portion 33 of the member 29 contact the posts 7, 7 below the pivot rivets 17, 17 as best shown in FIG. 4. The toggle is completed by a pair of links 34, 34 each having one end thereof pivotally connected on one each of the rivets 17, 17 on the outer sides of the posts 7, 7 and having the other ends thereof pivotally connected by rivets 35, 35 to the outer sides of the arms 33, wherefore, as shown in FIG. 4, the toggle joints each formed by one each of the arms 33 and one of the links 34 are in an over-center position limited by the said engagement of the bends 32, 32 with the posts 7, 7. Under these conditions, the base component and the rest of the device carried by the posts 7, 7 are held in this open position unitl these toggle joints are "broken" in the opposite direction.

The restraining bar and armrest means comprises a pair of axially aligned studs 36, 36 projecting from the outer sides of the posts 7, 7 at about armrest height with respect to the open seat assembly and a combined restraining bar and armrest assembly 37 is detachably mounted on said studs. The armrest assembly 37 comprises a length of tubing bent into modified U-shape including a front bar portion 38 and parallel arm portions 39, 39 spaced from each other by the same distance as are the posts 7, 7. Mounted on the outer side of one of the arm portions 39 by rivets 40 is an ear member 41 projecting beyond the end of the arm portion 39 and having a hole 42 therethrough disposed above the arm portion said hole being detachably engageable with one of the studs 36. The end of the other of the arm portions 39 carries an ear member 43 secured thereto by rivets 44, 44 and similarly projects rearwardly beyond the end of said other arm 39. The rear edge of said ear member 43 is provided with a forwardly and thence upwardly extending slot 45, the upper end of which is axially aligned with the stud receiving hole 42 in the ear member 41, said slot providing a hook engageable with the other of said pair of studs 36, 36. When the ear 41 is engaged with one of the studs 36 and the hook 45 of the ear 43 is similarly engaged with the other of the studs 36, the ends of the arms 39, 39 engage the posts 7, 7 to position the bar 37 in a position which is substantially at right angles to the posts 7, 7. The ear member 43 is further provided with a hole 46 extending therethrough below the hook forming slot 45 and the complementary one of the posts 7 carries a second stud 47 of less length than the stud 36, the portion of the ear member 43 through which the hole 46 extends being bent slightly outwardly as at 48 to engage the end of the stud 47 with a camming action as the armrest assembly is moved about the studs 36, 36 from a near vertical attitude to its position of use at right angles to the post 7 and momentarily laterally deforming the ear and the armrest bar until the hole 46 comes into registry with the stud 47 and the resilience of the armrest assembly 37 then causes the ear to move over the stud 47 thus locking the armrest assembly in its position of use.

Additionally, the forward end of the seat sub-assembly carries a strap 49 which may be looped over the bar 38 and then secured to itself by appropriate means such as snap fasteners 50.

Referring next to FIG. 3 the folded or collapsed seat is shown in its position for application to an automobile seat. The angularly disposed runs 5, 5 and the horizontal connecting member 4 of the base component 1 are inserted beneath the seat frame structure constituting the lower edge of the automobile seat back cushion and the device is then swung in a clockwise direction as viewed in FIGS. 3 and 4 until the collapsed device is positioned on the automobile seat cushion with the runs 5 and back bar 4 of the base component hooked under the rigid lower edge of the automobile seat back portion and, as shown in FIG. 4, engaging a rearwardly facing surface thereof. The seat and back assembly is then swung in a counterclockwise direction, as viewed in FIG. 4, about the pivot point formed by the rivets 6, 6 until the posts 7, 7 contact the back cushion of the automobile seat. The toggle joint means is forced to its overcenter position which generally results in a slight compression of both seat cushions for the reason that the angle formed by the surfaces of the erected device which engage the cushions of the vehicle seat and back is slightly greater than the usual angle between the vehicle seat and back cushions. In any event, the angle between the base portion and seat structure, when erected, is sufficient to prevent disengagement of the upturned rear end of the base portion from the frame structure of the vehicle back cushion, thus firmly securing the opened seat to the automobile seat. The seat sub-assembly is then swung down into its horizontal position with the bail 24 engaging the appropriate one of the hooks 23. For those automobiles in which the upward and forward tilt of the seat cushion is pronounced, the bail 24 may engage the rearmost one of the hooks 23 thus bringing the seat into a more horizontal position. When the device is to be removed, the seat sub-assembly is folded up against the back sub-assembly, it being noted that the length of the arm portions 22, 22 is sufficient to allow the seat cushion to lie substantially flat against the cushion of the back sub-assembly when thus folded up. The armrest assembly is disengaged from the stud 47 and is swung up into substaltial parallelism with the posts 7, 7. The toggle joint is then broken forwardly permitting the seat and back assembly to be brought down against the base component and the collapsed device is then swung upwardly in a counterclockwise direction as viewed in FIGS. 3 and 4 with resultant engagement thereof from the automobile seat.

The most common use of the device is, of course, as an auxiliary seat mountable on a motor vehicle seat. However, as best shown in FIGS. 1 and 2, in its erected position it may be placed on a floor or other surface thus giving it utility not possessed by the auxiliary seats which hook downwardly over the vehicle seat back cushion.

While in the foregoing specification there has been disclosed a presently preferred embodiment of the invention, such disclosure has been by way of example, wherefore, the invention is not to be deemed to be limited to the precise details of construction thus disclosed and it will be understood that the invention includes as well, all such changes and modifications in the parts, and in the construction, combination and arrangement of parts as shall come within the purview of the appended claims.

I claim:

1. In a child's seat adapted for detachable mounting on an automobile seat of the type including a seat cushion component and a back cushion component provided with a rigid frame member disposed parallel to and closely adjacent to the rear surface of the seat cushion; said child's seat comprising a base component having a portion adapted to be supported by the automobile seat cushion component and said portion of said base component including a rearward extension terminating in an upwardly turned end engageable in rear of the rigid frame member of the automobile back cushion which is adjacent to the automobile seat cushion, a collapsible seat structure including a back sub-assembly and a seat sub-assembly pivotally mounted on said base component and movable as a unit on said pivotal mounting from a collapsed position generally parallel to the automobile seat cushion engaging portion of said base component to an erected position in which the back portion of said back and seat assembly is disposed substantially at right angles to said base component for engagement with the automobile seat back cushion, and means extending between said base component and said back and seat assembly manually operable to releasably lock said back and seat assembly in said erected position on said base component and simultaneously positioning said upwardly turned end in rear of the rigid frame member of the automobile back cushion which is adjacent to the automobile seat cushion.

2. A child's seat as claimed in claim 1 in which in its erected position, the bottom surface of said base component and the back surface of said collapsible seat structure form an angle substantially equal to the angle formed by the uncompressed seat and back cushion surfaces of the vehicle seat contacted thereby and in which the erected seat structure is incapable of movement relative to the vehicle seat sufficient to disengage the interengagement of said upturned rear end portion of said base component with the seat back frame structure.

3. A child's seat as claimed in claim 1 in which said means for releasably locking said seat and back assembly in erected position on said base component comprises a toggle means movable over center incident to said erected position of said seat and back assembly, and in which stop means is provided to limit the extent of said over center movement of said toggle means.

4. In a child's seat, a base component adapted to rest on a supporting surface, a seat and back assembly mounted on said base component for pivotal movement between a collapsed position generally parallel to the supporting surface engaging portion of said base component and an erected position substantially at right angles to said collapsed position, and toggle means pivotally connected both to said base component and to said seat and back assembly operable to be moved to an overcenter position to releasably lock said seat and back assembly in erected position on said base component; said toggle means including a member thereof disposed to engage a surface portion of said seat and back assembly at a point adjacent to the point thereon at which it is pivotally connected incident to movement to said overcenter position and by said engagement to afford a releasable lock of said seat and back assembly in said erected position on said base component.

5. In a child's seat for detachable, self-interlocking engagement with an automobile seat of the type having separate seat and back cushions carried, respectively, by separate rigid frame components spaced from each other at the juxtaposed lower portion of the back cushion with the seat cushion, said child's seat comprising a base component adapted to rest on the seat cushion of the automobile seat to which the child's seat is to be interlocked and including a portion adapted to be projected through the space between the automobile seat cushion and the back cushion frame component and to engage a rearwardly facing surface of the automobile seat; said child's seat further including a combined seat and back assembly movable with respect to said base component between collapsed and erected positions thereon, means carried by said base component manually operable to lock said child's seat in erected position on said base component, said combined seat and back assembly upon movement to the said erected position, being effective to cooperate with said base component to cause said rearwardly projected portion of said base component to interlockingly engage a rearwardly facing surface of the automobile seat.

References Cited by the Examiner

UNITED STATES PATENTS

| 1,397,281 | 11/21 | Haas | 297—250 |
| 2,605,811 | 8/52 | Zoranovich | 297—253 |
| 2,642,923 | 6/53 | Roeder | 297—253 |
| 2,646,838 | 7/53 | Welsh | 297—253 |
| 2,792,054 | 5/57 | Muoio | 297—256 |
| 3,000,645 | 9/61 | Schmidt | 280—36 |

FOREIGN PATENTS

| 559,706 | 3/44 | Great Britain. |
| 814,559 | 6/59 | Great Britain. |

FRANK B. SHERRY, *Primary Examiner.*